Patented June 29, 1943

2,322,938

UNITED STATES PATENT OFFICE 2,322,938

STABILIZATION OF SUPERPOLYMERS

John B. Howard, Summit, N. J., assignor to Bell Telephone Laboratories, Incorporated, New York, N. Y., a corporation of New York No Drawing. Application September 8, 1939, Serial No. 293,949

7 Claims. (Cl. 260—75)

The present invention relates to the stabilization of synthetic linear condensation polymers of high molecular weight. More particularly, it relates to the stabilization of high molecular weight synthetic linear condensation polymers containing ester linkages in the linear chains of their molecules against decrease in molecular weight when exposed to the atmosphere at temperatures above the melting point of the polymers.

The simplest form of polymer containing ester linkages is the polyester. The preparation of polyesters and other linear condensation polymers of extremely high molecular weight has been described in the literature and in U. S. Patent 2,071,250 to W. H. Carothers. Polyesters of high molecular weight have been prepared by the reaction of a glycol with a dicarboxylic acid and also by the autoreaction of a hydroxy acid. In the case of preparation from a glycol and a dicarboxylic acid an excess of glycol is commonly used. Therefore, the polyester molecules formed in this manner will presumably possess a hydroxyl group at each end. If an excess of neither reagent is employed, theoretically one-half of the molecular endings will be carboxyl groups and one-half will be hydroxyl groups. In the case of polymers formed by the autoreaction of hydroxy acids, each polymer molecule will necessarily have a carboxyl group at one end and a hydroxyl group at the other. According to the present invention, it has been discovered that the nature of the end groups of the polyester molecules is one of the most important factors in determining the stability of these substances.

When the polyesters are prepared under the proper conditions, the condensation reaction may be carried on until molecules of extremely high molecular weight are obtained. When the average molecular weight of these polymers is sufficiently high, they possess the property of cold drawing. When thin fibres formed from these materials are cold drawn by subjecting them to tensile stress, the fibres are permanently elongated and a change in the physical properties of the material takes place. The fibres usually become more transparent and increase in tensile strength and elasticity. X-ray examinations show that the crystals of the substances become permanently oriented in the direction of the fibre axis after such tensile stress is applied.

To possess the property of cold drawing which was described above, the polymers must possess a very high degree of polymerization. The degree of polymerization is indicated generally by the relative viscosity of the substance in dilute solution.

Relative viscosity is the ratio between the viscosity of the substance in a suitable solvent and the viscosity of the solvent itself. This value can be obtained conveniently by comparing with the viscosity of chloroform the viscosity of a solution of 0.4 gram of the polymer in sufficient chloroform to form 100 cubic centimeters of solution.

The property of cold drawing begins to appear in synthetic linear condensation polymers when their relative viscosity, measured as above, exceeds about 1.2.

The region in which the cold drawing appears may also be expressed in terms of the average molecular weight of the polymer. The average molecular weight may be estimated by means of viscosity measurements according to the following relationship given by Staudinger in his book entitled "Die hochmolekularen organischen Verbingdungen" (1932, Berlin):

$$\frac{n_r - 1}{C} = K_m M$$

$n_r$ = relative viscosity of the solution,
$C$ = concentration of the solution in mols of the repeating group of the polymer per litre of solution,
$K_m$ = a constant characteristic of the series of polymers, and
$M$ = average molecular weight of the polymer.

Cold drawing begins to appear at an average molecular weight of about 7,000 but appears more definitely at about 8,000 to 10,000.

In making use of the polymers described above, as in molding, coating or impregnating operations, it is often necessary to maintain a pool of molten polymer in contact with the atmosphere for a considerable period of time. For instance, in the coating of electrical conductors or in the impregnation of fibrous coverings on electrical conductors, the conductors are continuously drawn through a bath of molten polymer. Considerable inconvenience and expense would be encountered if an attempt were made to exclude air from above the surface of the bath.

However, when polyesters are exposed to the atmosphere at temperatures above their melting points, they have been found to decrease continuously in average molecular weight. Polyesters which possess the property of cold drawing described above lose this desirable characteristic as their molecular weight decreases and also lose the characteristic toughness and flexibility of the superpolyesters.

According to the present invention, this molecular degradation of the polyesters is avoided by the addition of stabilizing agents. It has been discovered that when suitable antioxidant substances compatible with the polymers are incorporated in a molten bath of a polyester exposed to the atmosphere the rate of molecular breakdown is greatly diminished. In general, it is desirable that the stabilizing agent be non-alkaline since alkaline materials may tend to enter into unfavorable chemical reaction with the polyesters.

The following theory is believed to account for the molecular breakdown of the polyesters and for the stabilizing action of the antioxidant materials. Molecular degradation is believed to take place through the oxidation of the hydroxyl end groups of the polyester molecules upon exposure of the polymer to air at elevated temperatures. The hydroxyl groups are oxidized to aldehydic or acidic groups and water is released at the same time. Since the polyesters are extremely susceptible to hydrolysis at these temperatures, the water attacks the ester linkages in the central portion of the molecules and causes the breakdown of each molecule into two or more smaller melocules. Hydrolysis of each ester linkage causes the formation of a new hydroxyl group which is susceptible to oxidation. Thus, a complete cycle of oxidation and hydrolysis is believed to be carried on. The presence of the antioxidants in the polymer is believed to prevent the initial oxidation of the hydroxyl groups.

Substances which have been found to be capable of stabilizing synthetic linear condensation polymers containing ester linkages in this manner are the following:

Phenyl isocyanate
Alpha-naphthyl isocyanate
Dicyandiamide
Furfural
Trioxymethylene
Hexamethylenetetramine
Dimethylol urea
Beta-naphthol
Hydroquinone
Phenyl alpha-naphthylamine
p-Phenylphenacyl bromide
Furfuryl alcohol The effectiveness of these antioxidant materials as stabilizers is shown in the table given below. In each case a sample of the stabilizing agent indicated was thoroughly mixed with molten polyethylene sebacate at a temperature of 100 to 110° C. An amount of stabilizer equivalent to 10 mol per cent based on the molecular weight of the repeating unit of polyester was used in each case. The mixture was then placed in an oven in contact with the atmosphere at a temperature of 140° C. The unstabilized polymer decreased in molecular weight so that it was incapable of being cold drawn after twenty-four hours. The majority of the stabilized polymers were capable of being cold drawn even after exposure to the atmosphere at 140° C. for more than three hundred hours. In the table given below the criterion of failure of the polymer is the inability of fibres of the polymer to be cold drawn.

*Table I*

| Stabilizing agent | Time to failure |
|---|---|
| | *Hours* |
| None | 24 |
| Phenyl isocyanate | >300 |
| Alpha-naphthyl isocyanate | >303 |
| Dicyandiamide | >300 |
| Furfural | 210 |
| Trioxymethylene | 150 |
| Hexamethylenetetramine | >300 |
| Dimethylol urea | 130 |
| Beta-naphthol | >300 |
| Hydroquinone | >300 |
| Phenyl alpha-naphthylamine | >300 |
| p-Phenylphenacyl bromide | >300 |
| Furfuryl alcohol | >300 |

The stabilizing agent may be incorporated in the polymer in any suitable manner as by dissolving both the polymer and stabilizer in a suitable solvent or by incorporating the stabilizer into a body of molten polymer as indicated above. However, since the purpose of stabilization is to avoid molecular breakdown when the polymer is in a molten state, the stabilizer is most conveniently added to the bath of molten polymer when it is ready for use.

In general, the smallest amount of stabilizer which will give a satisfactory stabilization is 1/10 mol per cent based on the molecular weight of the repeating unit of the polymer or about 5/10 per ment by weight. In general, no additional stabilization is achieved by the use of more than 10 mol per cent of stabilizer. The following proportions of stabilizer have been found particularly effective.

*Parts by weight*

| 100 parts polyester | 1 part dicyandiamide |
| Do | 5 parts alpha-naphthyl isocyanate |
| Do | 2 parts phenyl isocyanate |
| Do | 3 parts beta-naphthol |
| Do | 5 parts p-phenylphenacyl bromide |

The stabilization of polyethylene sebacate specifically has been described above. The stabilization of other polyesters may be effected in the same manner, as, for instance, the polymers derived from succinic acid and ethylene glycol, adipic acid and decamethylene glycol, sebacic acid and decamethylene glycol, sebacic acid and diethylene glycol, azelaic acid and ethylene glycol, succinic acid and hexamethylene glycol and the polymer derived from the autoreaction of 10-hydroxy decanoic acid. Copolyesters, when similarly treated, also show improved stability. As examples of copolyesters which may be so treated may be mentioned the polymers derived from the reaction of ethylene glycol, propylene glycol, and sebacic acid and from the reaction of ethylene glycol, diethylene glycol and sebacic acid. The stabilization of other linear condensation polymers containing ester linkages in the linear chain, such as copolymers containing both ester and amide linkages, may be effected in the same manner. Examples of such polymers which may be stabilized are the polymers derived from decamethylene diamine, decamethylene glycol and sebacic acid, from decamethylene diamine, ethylene glycol and sebacic acid, from propylene diamine, ethylene glycol and duodecamethylene dicarboxylic acid, and from ethanolamine and sebacic acid.

In utilizing these stabilized polymers for coating or impregnating articles such as electrical conductors, the molten bath may be prepared by melting the solid unstabilized polymer and then stirring in the proper amount of stabilizer. Alternatively the stabilized polymer may be prepared first and stored in solid form; this stabilized polymer may then be melted to form the bath. The bath may be maintained in contact with the atmosphere while the electrical conductor is drawn continuously through it. Periodically the bath may be replenished by flowing in additional amounts of molten polymer mixed with a stabilizer. Although the bath may be exposed to the atmosphere continuously for long periods of time while the continuous coating operation is being carried on, the polymer will maintain its desirable properties.

The invention has been described in terms of its specific embodiments but it is to be understood that it is of general application and is to be limited only by the scope of the appended claims.

What is claimed is:

1. A linear polyester the condensation linkages of which consist essentially of ester linkages, said polyester having hydroxyl groups on a substantial proportion of the ends of its molecules, and having a molecular weight sufficiently high that it tends to undergo molecular degradation when maintained in contact with the atmosphere at elevated temperatures, said polyester containing a small proportion of a non-alkaline anti-oxidant substance.

2. The composition described in claim 1 wherein the polyester is a cold drawing polyester.

3. A coating or impregnating bath comprising a molten bath of the composition described in claim 1.

4. A cold drawing polyester, the condensation linkages of which consist essentially of ester linkages, said polyester having hydroxyl groups on a substantial proportion of the ends of its molecules and containing a small proportion of p-phenylphenacyl bromide as a stabilizing substance, said stabilized polyester being resistant to molecular degradation when exposed to the atmosphere at temperatures above its melting point.

5. A linear polyester the condensation linkages of which consist essentially of ester linkages, said polyester having hydroxyl groups on a substantial proportion of the ends of its molecules and having a molecular weight sufficiently high that it tends to undergo molecular degradation when maintained in contact with the atmosphere at elevated temperatures, said polyester containing a small proportion of dicyandiamide.

6. A linear polyester the condensation linkages of which consist essentially of ester linkages, said polyester having hydroxyl groups on a substantial proportion of the ends of its molecules and having a molecular weight sufficiently high that it tends to undergo molecular degradation when maintained in contact with the atmosphere at elevated temperatures, said polyester containing a small proportion of hydroquinone.

7. The method of coating a continuous article with a fusible cold drawing polyester which comprises continuously passing successive portions of said article through a molten bath exposed to the atmosphere and made up of a molten cold drawing polyester, the condensation linkages of which consist essentially of ester linkages and which has hydroxyl groups on a substantial proportion of the ends of the molecules, said molten polyester having dissolved therein a non-alkaline antioxidant substance.

JOHN B. HOWARD.